United States Patent
Yoshikawa

(10) Patent No.: US 10,473,412 B2
(45) Date of Patent: Nov. 12, 2019

(54) AIR-CONDITIONING CONTROL APPARATUS

(71) Applicant: DAIKIN INDUSTRIES, LTD., Osaka-shi, Osaka (JP)

(72) Inventor: Satoshi Yoshikawa, Osaka (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 15/556,139

(22) PCT Filed: Mar. 9, 2016

(86) PCT No.: PCT/JP2016/057450
§ 371 (c)(1),
(2) Date: Sep. 6, 2017

(87) PCT Pub. No.: WO2016/143830
PCT Pub. Date: Sep. 15, 2016

(65) Prior Publication Data
US 2018/0045474 A1    Feb. 15, 2018

(30) Foreign Application Priority Data

Mar. 9, 2015    (JP) .................................. 2015-046094

(51) Int. Cl.
*F28F 27/00*    (2006.01)
*F24F 11/30*    (2018.01)
(Continued)

(52) U.S. Cl.
CPC .............. *F28F 27/00* (2013.01); *F24F 11/30* (2018.01); *F24F 11/46* (2018.01); *F24F 11/56* (2018.01);
(Continued)

(58) Field of Classification Search
CPC ............................... F28F 27/00; G05B 13/048
See application file for complete search history.

(56) References Cited

U.S. PATENT DOCUMENTS 5,052,186 A * 10/1991 Dudley .................... F24H 4/04
62/215
5,318,224 A * 6/1994 Darby ................ G05D 23/1905
236/47
(Continued)

FOREIGN PATENT DOCUMENTS

EP    2 607 802 A2    6/2013
EP    2 610 558 A2    7/2013
(Continued)

OTHER PUBLICATIONS

Abe et al., Equipment Control Device, Equipment Control System, and Program, Jan. 9, 2014, JP2014003391A, Whole Document.*
(Continued)

*Primary Examiner* — Larry L Furdge
(74) *Attorney, Agent, or Firm* — Global IP Counselors, LLP

(57) ABSTRACT

An air-conditioning control apparatus includes an away detector, a position acquisition unit, a distance acquisition unit, and an instrument control unit. The away detector detects that a user is away from a building. The position acquisition unit acquires position information of a portable terminal carried by the user. The distance acquisition unit uses the position information acquired by the position acquisition unit to acquire distance information indicating how far the portable terminal is from the building when the away detector has detected that the user is away from the building. The instrument control unit controls an air conditioner installed in the building based on the distance information acquired by the distance acquisition unit, and the away time calculated by the time estimation unit, so that the air conditioner consumes less energy.

8 Claims, 14 Drawing Sheets

(51) Int. Cl.
*F24F 11/56* (2018.01)
*F24F 11/61* (2018.01)
*F24F 11/46* (2018.01)
*G05B 13/04* (2006.01)
*F24F 120/12* (2018.01)

(52) U.S. Cl.
CPC ............ *F24F 11/61* (2018.01); *G05B 13/048* (2013.01); *F24F 2120/12* (2018.01)

(56) References Cited

U.S. PATENT DOCUMENTS

| | | | | |
|---|---|---|---|---|
| 2006/0186214 | A1* | 8/2006 | Simon | G05D 23/1902 236/1 C |
| 2013/0025840 | A1* | 1/2013 | Remme | F24F 11/30 165/237 |
| 2013/0166073 | A1* | 6/2013 | Pine | F24F 11/0034 700/276 |
| 2014/0277762 | A1* | 9/2014 | Drew | F24F 11/0086 700/276 |
| 2015/0338116 | A1 | 11/2015 | Furuta et al. | |

FOREIGN PATENT DOCUMENTS

| | | | |
|---|---|---|---|
| JP | 2006-64324 | A | 3/2006 |
| JP | 2008-209035 | A | 9/2008 |
| JP | 2013-139954 | A | 7/2013 |
| JP | 2013133966 | A * | 7/2013 |
| JP | 2014-3391 | A | 1/2014 |
| JP | 2014003391 | A * | 1/2014 |
| JP | 2014-173818 | A | 9/2014 |
| WO | 2014/188670 | A1 | 11/2014 |

OTHER PUBLICATIONS

Nakamoto et al., Refrigerating Cycle Device, Jul. 8, 2013, JP2013133966A, Whole Document.*
International Search Report of corresponding PCT Application No. PCT/JP2016/057450 dated Jun. 7, 2016.
European Search Report of corresponding EP Application No. 16 76 1797.6 dated Jan. 26, 2018.
International Preliminary Report of corresponding PCT Application No. PCT/JP2016/057450 dated Sep. 21, 2017.

* cited by examiner

| DISTANCE THRESHOLD VALUE | 0 | T1 | T2 | T3 | T4 |
|---|---|---|---|---|---|
| AREA | | R1 | R2 | R3 | R4 |
| SETBACK VALUE | | S1 | S2 | S3 | S4 |
| GOING | FIRST PASSAGE TIME | 10 | 20 | 15 | |
| | SECOND PASSAGE TIME | 60 | 30 | 500 | 60 |
| RETURNING | THIRD PASSAGE TIME | 15 | 30 | 20 | |
| | FOURTH PASSAGE TIME | 30 | 60 | 40 | |
| | RETURN TIME | 15 | 45 | 65 | |

FIG. 9

AIR-CONDITIONING CONTROL APPARATUS

CROSS-REFERENCE TO RELATED APPLICATIONS

This U.S. National stage application claims priority under 35 U.S.C. § 119(a) to Japanese Patent Application No. 2015-046094, filed in Japan on Mar. 9, 2015, the entire contents of which are hereby incorporated herein by reference.

TECHNICAL FIELD

The present invention relates to an air-conditioning control apparatus.

BACKGROUND ART

In the prior art, apparatuses and systems have been used to control an air conditioner on the basis of position information of a user of a building in which the air conditioner is installed. For example, Japanese Laid-open Patent Publication No. 2014-173818 discloses an air-conditioning control apparatus to acquire a current position of a portable terminal carried by the user who is away from the building, and control the air conditioner on the basis of a distance between the portable terminal and the air conditioner. This air-conditioning control apparatus determines that the user is about to return and starts up the air conditioner when the distance between the portable terminal and the air conditioner, i.e., the distance between the user and the air conditioner is equal to or less than a predetermined threshold value. Additionally, when the rate of decrease of the distance between the user and the air conditioner is less than a predetermined threshold value, the air-conditioning control apparatus determines that the user is not approaching the air conditioner and stops the operation of the air conditioner in cases in which the air conditioner has been started up. Therefore, this air-conditioning control apparatus can suppress energy needlessly consumed by the air conditioner by controlling the air conditioner in accordance with the current position of the user when the user is returning.

SUMMARY

Technical Problem

This air-conditioning control apparatus can suppress the energy consumption of the air conditioner when the user is away while the air conditioner is stopping. However, when the user is away for a short time while the air conditioner is starting up, there is a risk that the air conditioner will automatically stop while the user is away and that the user will experience discomfort upon returning. There is also a risk that, regardless of the user being away for a long time, the air conditioner will repeatedly start and stop and energy will be needlessly consumed due to the distance between the user and the air conditioner being short and the user continuing to travel. Thus, a prior-art air-conditioning control apparatus is unable to appropriately control the air conditioner in accordance with events while the user is away, and is therefore subject to problems such as user discomfort and needless energy consumption.

An object of the present invention is to provide an air-conditioning control apparatus that can conserve energy as well as maintain a comfort level.

Solution to Problem

An air-conditioning control apparatus according to a first aspect of the present invention comprises an away detector, a position acquisition unit, a distance acquisition unit, a time estimation unit, and an instrument control unit. The away detector detects that a user is away from a building. The position acquisition unit acquires position information of a portable terminal carried by the user. Using the position information acquired by the position acquisition unit, the distance acquisition unit acquires distance information indicating how far the portable terminal is from the building when the away detector has detected that the user is away. The time estimation unit calculates an away time, the away time being an estimated value of a time beginning at a current timepoint and ending at a timepoint when the user returns, when the away detector has detected that the user is away. The instrument control unit controls an air conditioner installed in the building, on the basis of distance information acquired by the distance acquisition unit, and the away time calculated by the time estimation unit, so that the air conditioner consumes less energy.

The air-conditioning control apparatus according to the first aspect performs a control to suppress the energy consumption of the air conditioner in the building while the user is away from the building, on the basis of the distance information indicating how far the portable terminal carried by the user is from the building, and the away time which is an estimated value of the time beginning at the current time point and ending at the timepoint when the user returns. When the away time is long, this air-conditioning control apparatus can perform a control to sufficiently suppress the energy consumption of the air conditioner immediately after the user has left. In addition, the air-conditioning control apparatus can, with the air conditioner, ensure a comfort level in the building when the user returns to the building. Therefore, the air-conditioning control apparatus according to the first aspect can conserve energy as well as maintain the comfort level.

An air-conditioning control apparatus according to a second aspect of the present invention is the air-conditioning control apparatus according to the first aspect, wherein the instrument control unit controls the air conditioner by changing a setback value, which is a difference between a set temperature of the air conditioner when the away detector detects that the user is away, and a current set temperature.

The air-conditioning control apparatus according to the second aspect changes the set temperature of the air conditioner by changing the setback value on the basis of the distance information and the away time while the user is away. Therefore, the air-conditioning control apparatus according to the second aspect can conserve energy as well as maintain the comfort level.

An air-conditioning control apparatus according to a third aspect of the present invention is the air-conditioning control apparatus according to the second aspect, wherein when the air conditioner is performing an air-warming operation, the instrument control unit progressively increases the setback value to lower the set temperature as the away time becomes longer, and when the air conditioner is performing an air-cooling operation, the instrument control unit progressively increases the setback value to raise the set temperature as the away time becomes longer.

With the air-conditioning control apparatus according to the third aspect, as the away time becomes longer, the setback value is progressively increased to lower the energy consumption of the air conditioner. Therefore, the air-con ditioning control apparatus according to the third aspect can conserve energy as well as maintain the comfort level.

An air-conditioning control apparatus according to a fourth aspect of the present invention is the air-conditioning control apparatus according to the second or third aspect, further comprising a learning storage unit. The learning storage unit learns and stores a passage time, the passage time being a time needed by the user to pass through each of a plurality of preset areas, using the distance information. The time estimation unit calculates the away time on the basis of the passage time stored in the learning storage unit. The instrument control unit changes the setback value on the basis of the away time calculated by the time estimation unit.

With the air-conditioning control apparatus according to the fourth aspect, the passage time is learned, the passage time being the time needed by the user to pass through each of the plurality of preset areas; the time needed by the user to pass through each area is estimated; and the away time is calculated. This air-conditioning control apparatus is able to set the optimal setback value on the basis of the calculated away time, and to control the air conditioner. Therefore, the air-conditioning control apparatus according to the fourth aspect can conserve energy as well as maintain the comfort level.

An air-conditioning control apparatus according to a fifth aspect of the present invention is the air-conditioning control apparatus according to any of the second through fourth aspects, wherein the instrument control unit changes the setback value on the basis of the away time and a shortest time needed by the user to return from each of the plurality of preset areas.

The air-conditioning control apparatus according to the fifth aspect is able to set the optimal setback value on the basis of the away time and the shortest time needed by the user to return from each of the plurality of preset areas, and is able to control the air conditioner. Therefore, the air-conditioning control apparatus according to the fifth aspect can conserve energy as well as maintain the comfort level.

An air-conditioning control apparatus according to a sixth aspect of the present invention is the air-conditioning control apparatus according to any one of the second through fifth aspects, wherein the instrument control unit calculates the setback value that is based on the distance information and the away time for each one of a plurality of the portable terminals, and controls the air conditioner using the smallest setback value.

With the air-conditioning control apparatus according to the sixth aspect, the optimal setback value can be set to control the air conditioner even when there are a plurality of users of the building. Therefore, the air-conditioning control apparatus according to the sixth aspect can conserve energy as well as maintain the comfort level.

An air-conditioning control apparatus according to a seventh aspect of the present invention is the air-conditioning control apparatus according to any of the first through sixth aspects, wherein the instrument control unit controls the air conditioner via any one of a first control to a sixth control. The first control is a control to change an operating frequency of the air conditioner. The second control is a control to change an evaporation temperature of a refrigerant of the air conditioner. The third control is a control to change a water supply temperature or an air supply temperature of the air conditioner. The fourth control is a combination control of the first control and the second control. The fifth control is a combination control of the first control and the third control. The sixth control is a combination control of the first control, the second control, and the third control.

With the air-conditioning control apparatus according to the seventh aspect, the air conditioner is controlled by changing the operating frequency of the air conditioner on the basis of the distance information while the user is away. The operating frequency of the air conditioner is the operating frequency of a compressor inside the air conditioner. The air-conditioning control apparatus performs a control to, e.g., progressively lower the operating frequency of the air conditioner as the distance between the portable terminal and the building becomes longer, to suppress the energy consumption of the air conditioner. Additionally, this air-conditioning control apparatus controls the air conditioner by changing the evaporation temperature of the refrigerant of the air conditioner on the basis of the distance information while the user is away. For example, the air-conditioning control apparatus performs a control to raise the evaporation temperature of the refrigerant of the air conditioner during the air-cooling operation. Additionally, this air-conditioning control apparatus controls the air conditioner by changing the water supply temperature or the air supply temperature of the air conditioner on the basis of the distance information while the user is away. For example, the air-conditioning control apparatus performs a control to further raise the water supply temperature or the air supply temperature of the air conditioner during the air-cooling operation, and to further lower the water supply temperature or the air supply temperature of the air conditioner during the air-warming operation. Additionally, this air-conditioning control apparatus may control the air conditioner by changing the operating frequency and the evaporation temperature of the refrigerant. Additionally, this air-conditioning control apparatus may control the air conditioner by changing either the operating frequency and the water supply temperature, or the operating frequency and the air supply temperature. Additionally, this air-conditioning control apparatus may control the air conditioner by changing the water supply temperature or the air supply temperature in addition to the operating frequency and the evaporation temperature of the refrigerant. Through these controls, the energy consumption of the air conditioner is suppressed, and the air-conditioning control apparatus can be operated more efficiently. Therefore, the air-conditioning control apparatus according to the seventh aspect can conserve energy as well as maintain the comfort level.

An air-conditioning control apparatus according to an eighth aspect of the present invention is the air-conditioning control apparatus according to the seventh aspect, wherein the instrument control unit changes the operating frequency to be within a range from a predetermined lower limit value to a predetermined upper limit value in the first control, the fourth control, the fifth control, and the sixth control.

With the air-conditioning control apparatus according to the eighth aspect, because a lower limit value and an upper limit value are set on the operating frequency of the air conditioner, the occurrence of the problem of a too-low operating efficiency of the air conditioner is suppressed. Therefore, the air-conditioning control apparatus according to the eighth aspect can perform efficient operation.

Advantageous Effects of Invention

The air-conditioning control apparatus according to the first through eighth aspects of the present invention can conserve energy as well as maintain a comfort level.

BRIEF DESCRIPTION OF THE DRAWINGS

FIG. 9 is a table, similar to FIG. 3, in which the behavior pattern of the user shown in FIG. 8 is indicated by arrows;

DESCRIPTION OF EMBODIMENTS

First Embodiment

An air-conditioning control system including an air-conditioning control apparatus according to a first embodiment of the present invention is described with reference to the drawings. The air-conditioning control system uses a portable terminal, which a user of a building carries on their person while away from the building, to control an air conditioner installed in the building. The "building" could be a detached residence, dwelling units of a multiple dwelling house, or offices of an office building, etc. The "user" could be a resident of a dwelling, a worker in an office, etc. In the present embodiment, the "building" is a detached residence and the "user" is a single resident of the detached residence.

(1) Configuration of Air-Conditioning Control System

Figure 1:
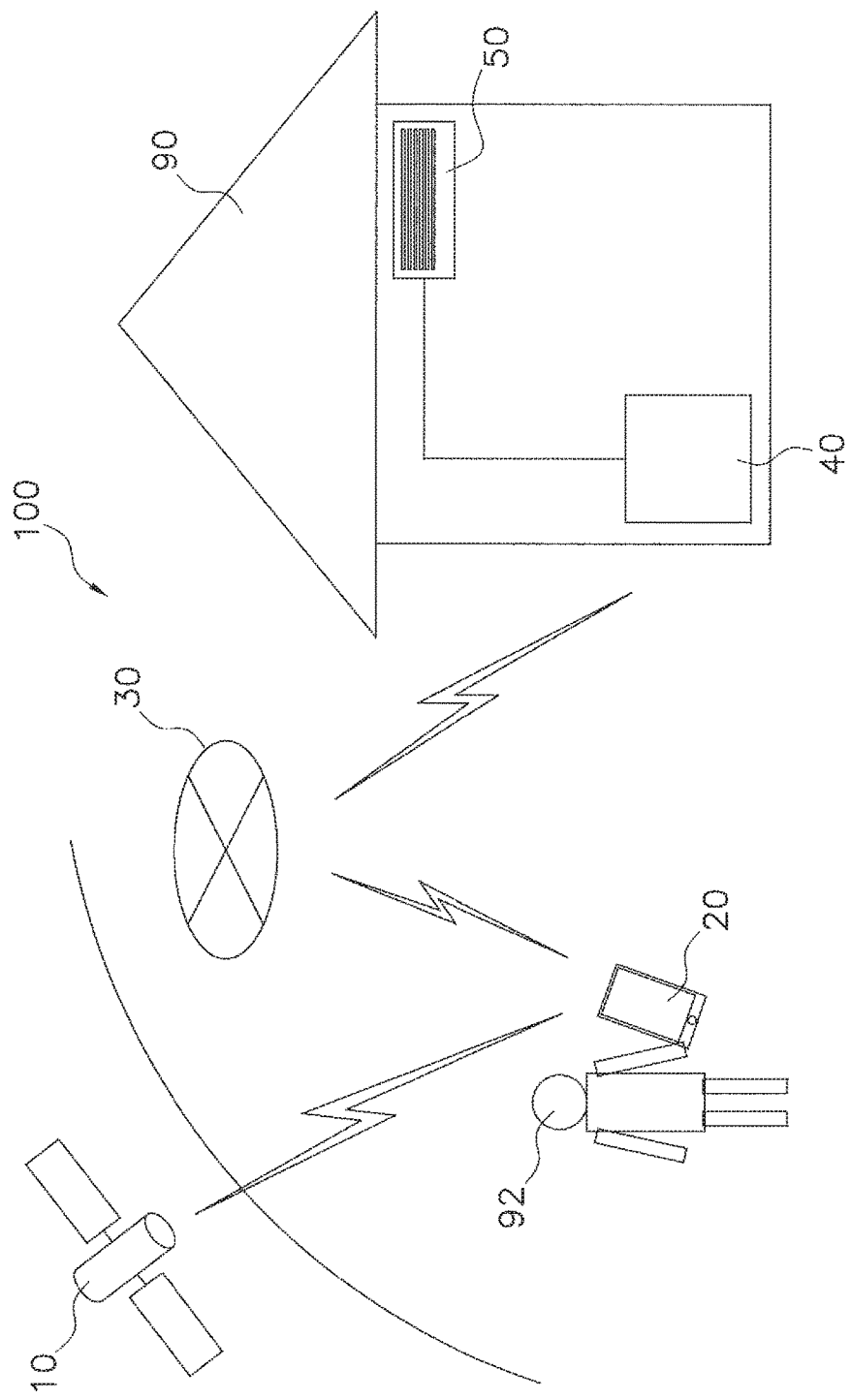
FIG. 1 is a schematic configuration diagram of an air-conditioning control system including an air-conditioning control apparatus according to a first embodiment.
Figure 2:
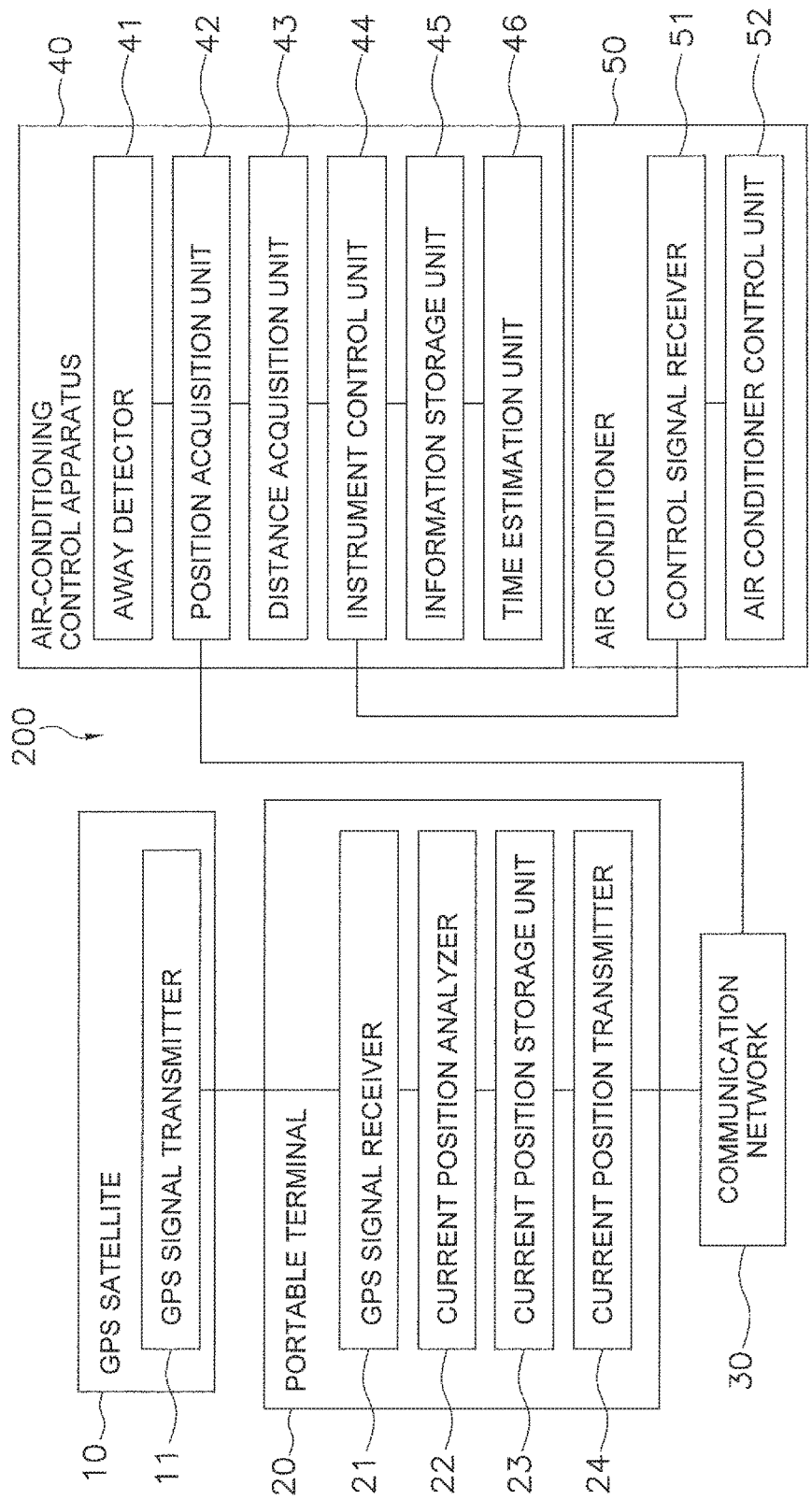
FIG. 2 is a block diagram showing the detailed configuration of the air-conditioning control system.

FIG. 1 is a schematic configuration diagram of an air-conditioning control system 100 including an air-conditioning control apparatus 40. FIG. 2 is a block diagram showing the detailed configuration of the air-conditioning control system 100 shown in FIG. 1. The air-conditioning control system 100 is mainly configured from a GPS satellite 10, a portable terminal 20, a communication network 30, the air-conditioning control apparatus 40, and an air conditioner 50.

(1-1) GPS Satellite

The GPS satellite 10 has a global positioning system (GPS) function for specifying the current position of the portable terminal 20. The GPS satellite 10 mainly includes a GPS signal transmitter 11. The GPS signal transmitter 11 wirelessly transmits the flight position and other data of the GPS satellite 10 to the portable terminal 20. Normally, a plurality of GPS satellites 10 are used in order to specify the position on the earth's surface, using a GPS. Therefore, while not shown in FIG. 1, data is wirelessly transmitted to the portable terminal 20 from a plurality of GPS satellites 10.

(1-2) Portable Terminal

The portable terminal 20 is a small instrument that a user 92 of a building 90 holds and carries on their person while away from the building. The portable terminal 20 has a GPS function for receiving radio waves from the GPS satellites 10 and specifying the current position of the terminal. The portable terminal 20 is a portable telephone, a smartphone, a tablet terminal, etc. The portable terminal 20 mainly includes a GPS signal receiver 21, a current position analyzer 22, a current position storage unit 23, and a current position transmitter 24.

The GPS signal receiver 21 wirelessly receives flight positions and other data of the GPS satellites 10 from the OPS signal transmitters 11 of the plurality of GPS satellites 10, and inputs this data to the current position analyzer 22.

On the basis of, inter cilia, the data received from the GPS satellites 10 by the GPS signal receiver 21, and radio wave transmission time from the GPS satellites 10, the current position analyzer 22 estimates the distances between the portable terminal 20 and the GPS satellites 10. The current position analyzer 22 then uses the estimated distances to the GPS satellites 10 and the flight positions of the GPS satellites 10 to calculate the current position of the portable terminal 20 by an analytical technique. The current position of the portable terminal 20 may be represented in latitude and longitude coordinates or in some other format.

The current position storage unit 23 stores the current position of the portable terminal 20 calculated by the current position analyzer 22.

Via the communication network 30, the current position transmitter 24 transmits the current position of the portable terminal 20 stored in the current position storage unit 23 to the air-conditioning control apparatus 40.

(1-3) Communication Network

The communication network 30 is any communication circuit network that enables communication between the portable terminal 20 and the air-conditioning control apparatus 40. The communication network 30 can utilize an internet connection. For example, the portable terminal 20 is wirelessly connected with an internet connection via, inter alia, a 3G network and an LTE network, and the air-conditioning control apparatus 40 is connected with an internet connection via, inter alia, a LAN network and a Wifi® spot installed in the building 90.

(1-4) Air-Conditioning Control Apparatus

The air-conditioning control apparatus 40 is a computer installed in the building 90. The air-conditioning control apparatus 40 is a dedicated electronic instrument including a micro-controller and an input/output interface. The air-conditioning control apparatus 40 is connected either by wires or wirelessly with the air conditioner 50 installed in the building 90. The micro-controller of the air-conditioning control apparatus 40 mainly stores: programs consisting of an away detector 41, a position acquisition unit 42, a distance acquisition unit 43, a time estimation unit 46, an instrument control unit 44, and an information storage unit 45; and data used by these programs.

The away detector 41 detects that the user 92 is away from the building 90. For example, the away detector 41 analyzes images captured by a monitoring camera (not shown) installed in an entrance/exit of the building 90, and detects that the user 92 is away. In this case, the monitoring camera, which is connected either by wires or wirelessly with the air-conditioning control apparatus 40, captures the face of a person passing through the entrance/exit of the building 90. When the away detector 41 has detected that the user 92 of the building 90 has moved from the inside of the building 90 to the outside of the building 90, the user 92 is determined to be away from the building 90. When the away detector 41 has detected that the user 92 of the building 90 has moved from the outside of the building 90 to the inside of the building 90, the user 92 is determined to have returned to the building 90.

The position acquisition unit 42 receives and acquires the current position of the portable terminal 20 transmitted from the current position transmitter 24 of the portable terminal 20. The position acquisition unit 42 causes the information storage unit 45 to store the acquired current position of the portable terminal 20. The position acquisition unit 42 acquires the current position of the portable terminal 20 at predetermined intervals. The predetermined interval is an interval that does not impose an excessive load on the micro-controller of the air-conditioning control apparatus 40; e.g., one second.

When the away detector 41 has detected that the user 92 is away, the distance acquisition unit 43 acquires distance information from the current position of the portable terminal 20 stored in the information storage unit 45, and the position of the building 90. The distance information includes at least a terminal distance, which is a linear distance between the portable terminal 20 and the building 90 on the earth's surface. The position of the building 90 is represented in the same format as the current position of the portable terminal 20. Because the portable terminal 20 is held by the user 92, the current position of the portable terminal 20 is the current position of the user 92 who is away. Therefore, the term "terminal distance" means the minimum distance between the user 92 who is away and the building 90. While the user 92 is inside the building 90, the terminal distance is zero.

When the away detector 41 has detected that the user 92 is away, the time estimation unit 46 calculates an away time on the basis of the current position of the user 92, the away time being an estimated value of a time from a current timepoint until a timepoint when the user 92 returns.

The instrument control unit 44 controls the air conditioner 50 on the basis of the distance information acquired by the distance acquisition unit 43, and the away time calculated by the time estimation unit 46, so that the air conditioner 50 installed in the building 90 consumes less energy. Specifically, the instrument control unit 44 controls the air conditioner 50 by changing a setback value. The setback value is the difference between an away-time set temperature, which is the set temperature of the air conditioner 50 when the away detector 41 has detected that the user 92 is away, and the current set temperature of the air conditioner 50. The away-time set temperature is also the set temperature of the air conditioner 50 when the user 92 is inside the building 90. The away-time set temperature does not change from the time the user 92 leaves the building 90 until the time the user 92 returns. Therefore, the instrument control unit 44 can change the current set temperature of the air conditioner 50 by changing the setback value. The instrument control unit 44 transmits control signals at predetermined intervals to the air conditioner 50 to control the air conditioner 50. The predetermined interval is an interval that does not impose an excessive load on the micro-controller of the air-conditioning control apparatus 40, e.g., one second. The control signals include, inter alia, data pertaining to the set temperature of the air conditioner 50, which has been changed by the instrument control unit 44.

The information storage unit 45 stores the current position of the portable terminal 20, the position of the building 90, a behavior pattern of the user 92, the set temperature of the air conditioner 50, the setback value, and other data. The behavior pattern of the user 92 is data pertaining to areas R1 to R4 through which the user has previously passed while away. The air-conditioning control apparatus 40 records the while-away behavior pattern of the user 92 in possession of the portable terminal 20, and causes the information storage unit 45 to store the behavior pattern.

(1-5) Air Conditioner

The air conditioner 50 is an air-cooling and air-warming instrument including a refrigeration circuit. The air conditioner 50 may include a boiler or another combustion air-warming apparatus. The air conditioner 50 mainly includes a control signal receiver 51 and an air conditioner control unit 52.

The control signal receiver 51 receives control signals transmitted from the instrument control unit 44 of the air-conditioning control apparatus 40.

The air conditioner control unit 52 controls the cooling and heating operations of the air conditioner 50 on the basis of the control signals received by the control signal receiver 51. Specifically, the air conditioner control unit 52 acquires from the control signals the set temperature of the air conditioner 50 changed by the instrument control unit 44, and controls the air conditioner 50 on the basis of the acquired set temperature.

(2) Action of Air-Conditioning Control System

Control of the air conditioner 50 by the air-conditioning control apparatus 40 of the air-conditioning control system 100 shall be described. When the air conditioner 50 is performing an air-warming operation, the instrument control unit 44 of the air-conditioning control apparatus 40 progressively increases the setback value and lowers the set temperature of the air conditioner 50 as the away time becomes longer. When the air conditioner 50 is performing an air-cooling operation, the instrument control unit 44 progressively increases the setback value and raises the set temperature of the air conditioner 50 as the away time becomes longer. Thus, while the user 92 is away from the building 90, the set temperature of the air conditioner 50 is automatically controlled on the basis of the setback value changed by the instrument control unit 44. While the user 92 is inside the building 90, the setback value is zero and the air conditioner 50 operates on the basis of the set temperature.

During the air-warming operation, the setback value is the away-time set temperature minus the current set temperature of the air conditioner 50. Therefore, during the air-warming operation, the set temperature of the air conditioner 50 is changed to lower values as the setback value is greater. During the air-cooling operation, the setback value is the current set temperature of the air conditioner 50 minus the away-time set temperature. Therefore, during the air-cooling operation, the set temperature of the air conditioner 50 after the change is changed to higher values as the setback value is greater. Commonly, the set temperature of the air conditioner 50 further approaches the outside air temperature as the setback value becomes greater, and the air conditioner 50 therefore consumes less energy.

Figure 3:
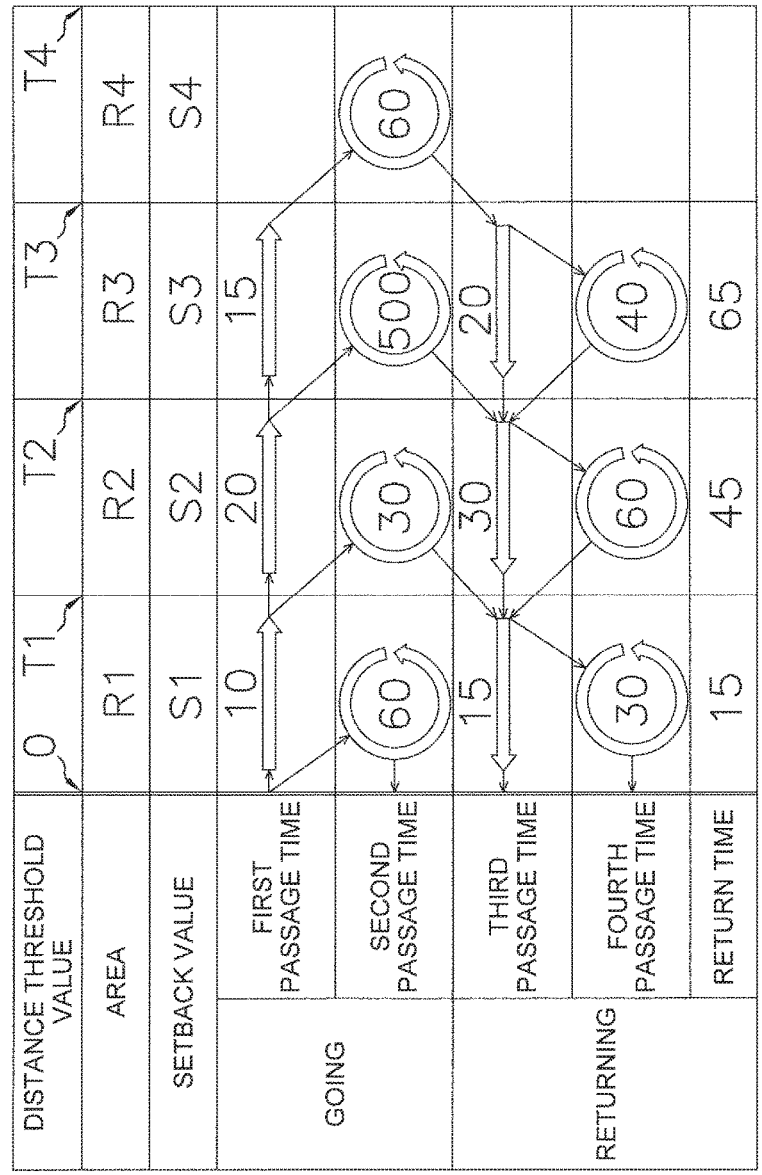
FIG. 3 is a table showing an example of passage times of each area.

FIG. 3 is a table showing examples of passage times, which are times needed for the user 92 to pass through each of the areas R1 to R4. The areas R1 to R4 are areas through which the user 92 passes while away, and are divided according to distance threshold values T1 to T4. The distance threshold values T1 to T4 have the relationship T1<T2<T3<T4, and the distance threshold value T1 is greater than zero. The area R1 is a range in which the terminal distance is greater than zero and equal to or less than T1. The area R2 is a range in which the terminal distance is greater than T1 and equal to or less than T2. The area R3 is a range in which the terminal distance is greater than T2 and equal to or less than T3. The area R4 is a range in which the terminal distance is greater than T3 and equal to or less than T4. The distance threshold values T1 to T4 are set manually by someone such as a manager of the air-conditioning control system 100.

Setback values corresponding to each of the areas R1 to R4 are set. The setback value corresponding to the area R1 is S1. The setback value corresponding to the area R2 is S2. The setback value corresponding to the area R3 is S3. The setback value corresponding to the area R4 is 54, The setback values S1 to S4 have the relationship S1<S2<S3<S4, and the setback value S1 is equal to or greater than zero. The setback values S1 to S4 are set manually by someone such as the manager of the air-conditioning control system 100.

FIG. 3 shows two types of passage times for when the user 92 has left the building 90 and is moving away from the building 90 (going), and two types of passage times for when the user 92 is returning toward the building 90 (returning). The two types of passage times for going are hereinafter referred to as first passage times and second passage times, and the two types of passage times for returning are hereinafter referred to as third passage times and fourth passage times. The units of the passage times shown in FIG. 3 are in minutes. The arrows shown in FIG. 3 indicate routes that the user 90 can take while away.

The user 92, when going, travels from the building 90 toward the areas R1 to R4. The first passage times of each of the areas R1 to R4 for going are the shortest times needed to pass through the areas. For example, the first passage time of the area R2 for going (20 minutes) is the shortest time needed for the user 92 to travel from the distance threshold value T1 to the distance threshold value T2. The second passage times of each of the areas R1 to R4 for going are the shortest times needed to pass through the areas when the user is returning toward the building 90 after having reached each of the areas R1 to R4. For example, the second passage time of the area R2 for going (30 minutes) is the shortest time needed for the user 92, after having passed through a spot at the distance threshold value T1 and then staying for a predetermined time in the area R2, to once more pass through the spot at the distance threshold value T1.

The user 92, when returning, travels toward the building 90 from the areas R1 to R4. The third passage times of each of the areas R1 to R4 for returning are the shortest times needed to pass through the areas. For example, the third passage time of the area R2 for returning (30 minutes) is the shortest time needed for the user 92 to travel from the distance threshold value T2 to the distance threshold value T1. The fourth passage times of each of the areas R1 to R4 for returning are the shortest times needed for the user to pass through the areas when the user has arrived at each of the areas R1 to R4 and then stays for a predetermined time at the areas. For example, the fourth passage time of the area R2 for returning (60 minutes) is the shortest time needed for the user 92, after having passed through a spot at the distance threshold value T2 and then staying for a predetermined time in the area R2, to pass through the spot at the distance threshold value T1. In each of the areas R1 to R4, the fourth passage times are longer than the third passage times.

The lowest row of the table shown in FIG. 3 shows return times, which are the shortest times needed for the user 92 to return to the building 90 from each of the areas R1 to R4. For example, the return time of the area R2 is 45 minutes, which is the total of the third passage times of the areas R2 and R1 for returning.

The instrument control unit 44 sets the setback value at predetermined timings to the values S1 to S4 corresponding to each of the areas R1 to R4. The timings at which the instrument control unit 44 sets the setback value are: when the user 92 leaves, when the passage time of the area R1 to R4 where the user 92 is currently positioned elapses, and when there is a change of the area R1 to R4 where the user 92 is currently positioned.

Figure 4:
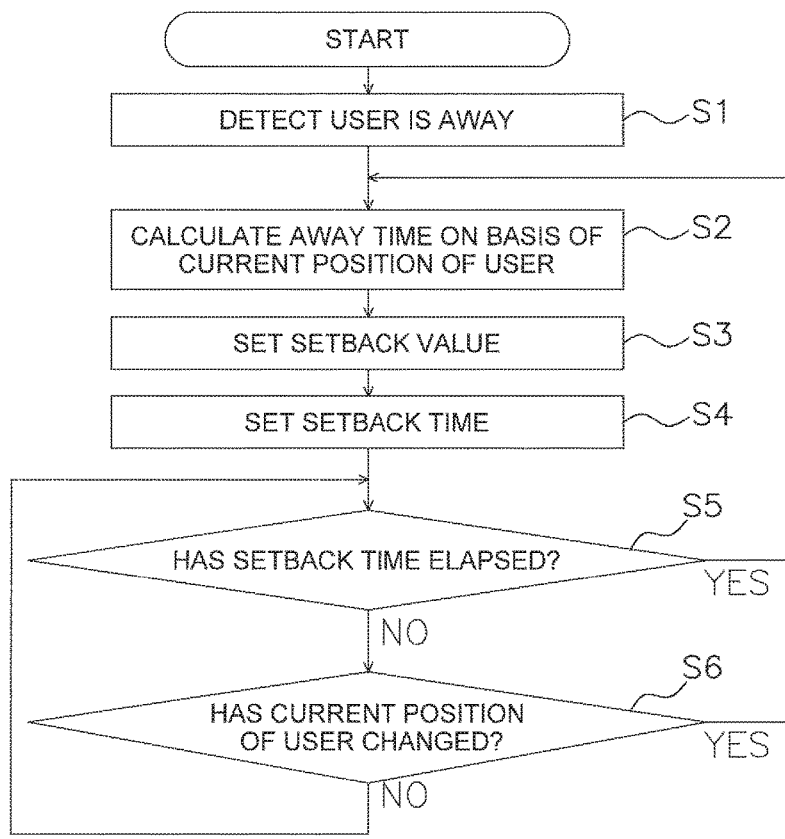
FIG. 4 is a flowchart pertaining to a process by which the air-conditioning control apparatus sets a setback value.

FIG. 4 is a flowchart pertaining to a process whereby the air-conditioning control apparatus 40 sets the setback value. In step S1, the away detector 41 detects that the user 92 is away from the building 90.

In step S2, on the basis of the current position of the user 92, the time estimation unit 46 calculates an away time, which is an estimated value of the time from the current timepoint until the timepoint when the user 92 returns.

In step S3, the instrument control unit 44 sets the setback value. The instrument control unit 44 sets a setback value that corresponds to the area closest to the building 90 among the areas R1 to R4 that have return times longer than the away time calculated in step S2.

In step S4, the instrument control unit 44 sets a setback time. The setback time is the time during which the setback value set in step S3 will be continued. When the user is going, the setback time is the passage time that was used to calculate the away time, between the first and second passage times of the area where the user 92 is currently positioned. When the user is returning, the setback time is the passage time that was used to calculate the away time, between the third and fourth passage times of the area where the user 92 is currently positioned.

In step S5, whether or not the setback time set in step S4 has elapsed is determined, using as a standard a timepoint at which the user 92 has reached the area of their current position. When the setback time has elapsed, the process transitions to step S2. When the setback time has not elapsed, the process transitions to step S6.

In step S6, a determination is made as to whether or not the area where the user 92 is currently positioned has changed from the timepoint at which the setback time was set in step S4. When the area where the user 92 is currently positioned has changed, the process transitions to step S2. When the area where the user 92 is currently positioned has not changed, the process transitions to step S5.

Next, two specific examples pertaining to the process shown in FIG. 4 are described, using FIG. 3 as a basis.

(2-1) First Example

Figure 5:
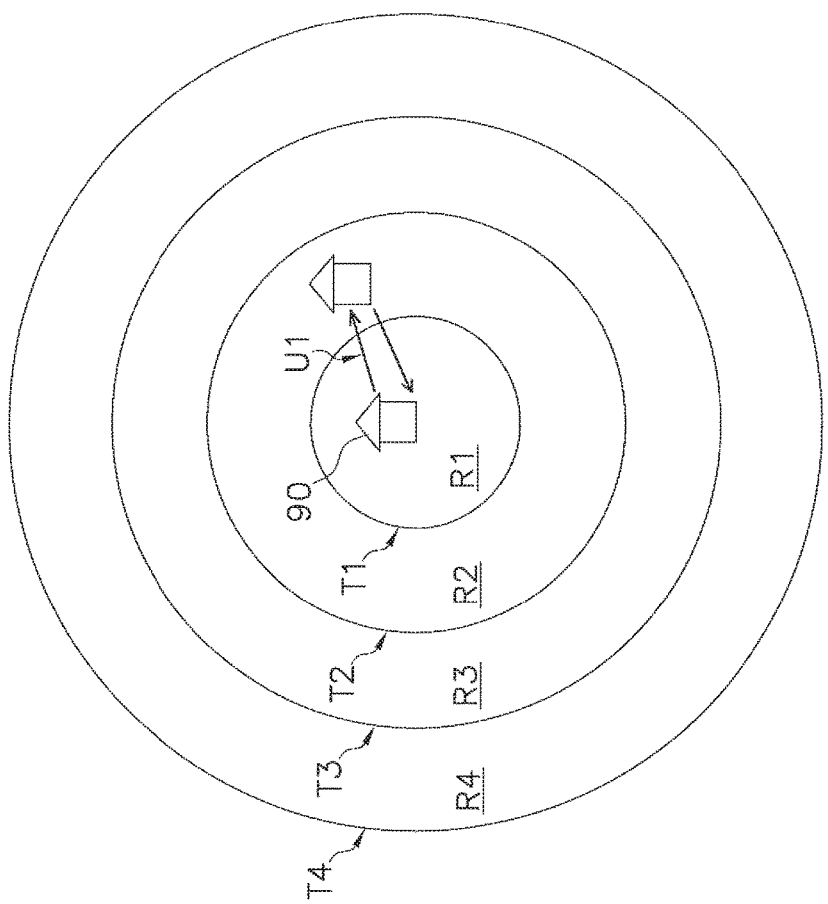
FIG. 5 is a drawing of a first example of a behavior pattern of a user.
Figure 6:
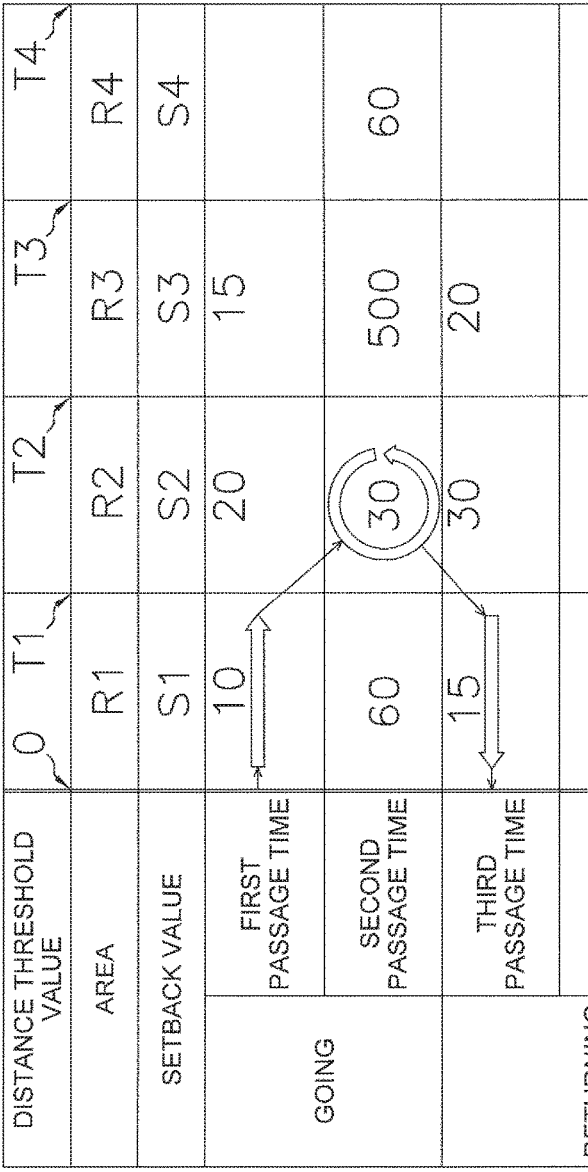
FIG. 6 is a table, similar to FIG. 3, in which the behavior pattern of the user shown in FIG. 5 is indicated by arrows.

FIG. 5 is a drawing showing a first example of a behavior pattern of the user 92. In FIG. 5, arrows are used to indicate a first away route U1, which is a behavior pattern beginning with the user 92 leaving the building 90 and ending with the user returning. FIG. 5 shows the distance threshold values T1 to T4 and the areas R1 to R4. In FIG. 6, which is a table similar to FIG. 3, only the first away route U1 is indicated by arrows. The behavior of the user 92 while away is to pass through the areas R1, R2 with the passage times shown in FIG. 6.

In this example, first, the user 92 is detected to be away in step S1 of FIG. 4, after which, in step S2, the away time during which the user 92 is away is calculated to be 55 minutes, which is the total of the first passage time of the area R1 (10 minutes), the second passage time of the area R2 (30 minutes), and the third passage time of the area R1 (15 minutes). The away time (55 minutes) is longer than the return time of the area R2 (45 minutes), and equal to or less than the return time of the area R3 (65 minutes). In this case, in step S3, the setback value is set to the setback value S3 corresponding to the area R3.

Next, in step S4, the setback time is set to 10 minutes, which, between the first and second passage times of the area R1 where the user 92 is currently positioned while going immediately after having left, is the first passage time of the area R1 used to calculate the away time in step S2.

Next, in step S5, a determination is made as to whether or not the setback time of 10 minutes has elapsed since the user 92 left. When the setback time has not elapsed, the process transitions to step S6. However, because the user 92 stays in the area R1 and the area where the user 92 is currently positioned does not change until the setback time since the user 92 has left elapses, the process returns from step S6 to step S5. Therefore, the process of steps S5 and S6 is repeated until the setback time elapses. When the setback time elapses, the process transitions from step S5 to step S2. At this time, the current position of the user 92 changes from the area R1 to the area R2 due to the user 92 passing the distance threshold value T1, as shown in FIG. 6.

Next, in step S2, the away time is again calculated on the basis of the area R2 where the user 92 is currently positioned. The away time is calculated to be 45 minutes, which is the total of the second passage time of the area R2 (30 minutes) and the third passage time of the area R1 (15 minutes). The away time (45 minutes) is longer than the return time of the area R1 (15 minutes) and equal to or less than the return time of the area R2 (45 minutes). In this case, in step S3, the setback value is set to the setback value S2 corresponding to the area R2.

Next, in step S4, the setback time is set to 30 minutes, which, between the first and second passage times of the area R2 where the user 92 is currently positioned while going, is the second passage time of the area R2 used to calculate the away time in step S2.

Next, in step S5, when the setback time of 30 minutes has elapsed since the timepoint when the user 92 traveled to the area R2 (when 40 minutes have elapsed since the user left), the process transitions to step S2. At this time, the current position of the user 92 changes from the area R2 to the area R1 due to the user 92 passing through the distance threshold value T1, as shown in FIG. 6.

Next, in step S2, the away time is again calculated on the basis of the area R1 where the user 92 is currently positioned. The away time is calculated to be 15 minutes, which is the third passage time of the area R1. The away time (15 minutes) is equal to or less than the return time of the area R1 (15 minutes). In this case, in step S3, the setback value is set to the setback value S1 corresponding to the area R1.

Next, in step S4, the setback time is set to 15 minutes, which, between the third and fourth passage times of the area R1 where the user 92 is currently positioned while returning, is the third passage time of the area R1 used to calculate the away time in step S2.

Next, in step S5, when the setback time of 15 minutes has elapsed since the timepoint when the user 92 traveled to the area R1 (when 55 minutes have elapsed since the user left), the process transitions to step S2. At this time, the current position of the user 92 changes from the area R1 to the inside of the building 90 as shown in FIG. 6, and the user has therefore returned. Therefore, the setback value is set to zero.

Figure 7:
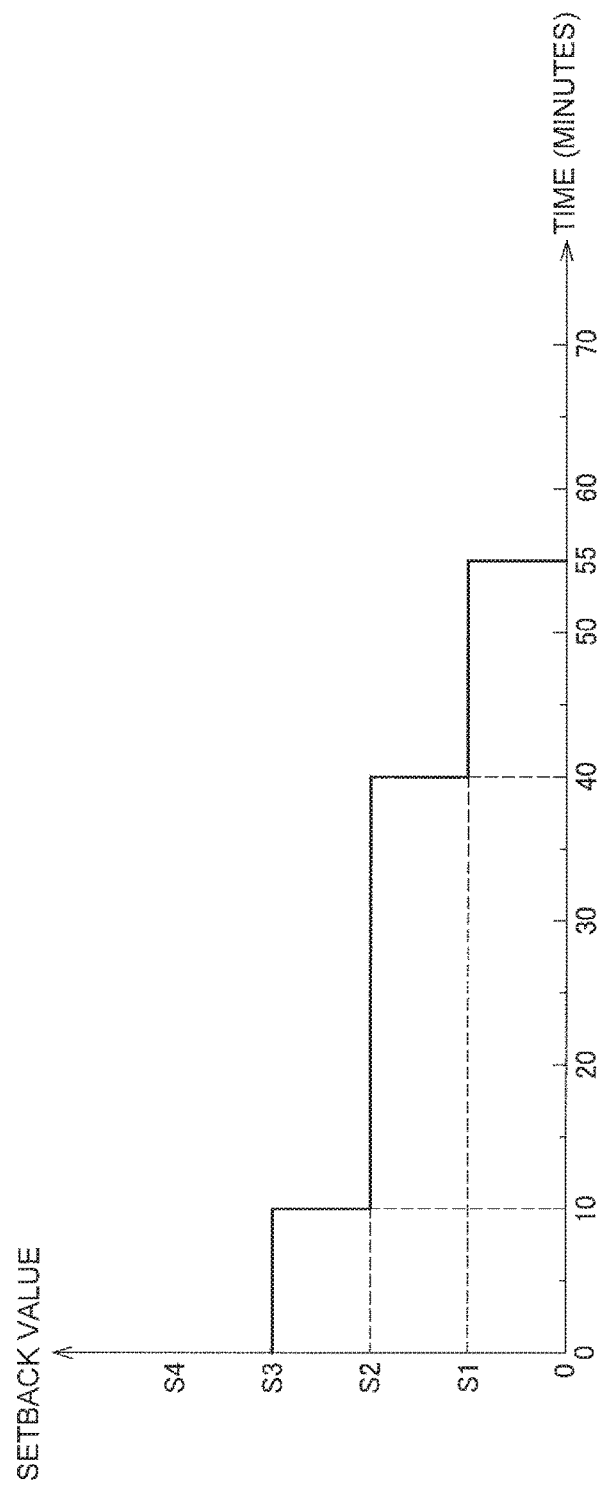
FIG. 7, corresponding to FIG. 5, is a graph representing changes over time in the setback values.

FIG. 7 is a graph representing change over time in the setback value while the user 92 is away and following the first away route U1 shown in FIG. 5, The vertical axis represents setback values, and the horizontal axis represents time.

(2-2) Second Example

Figure 8:
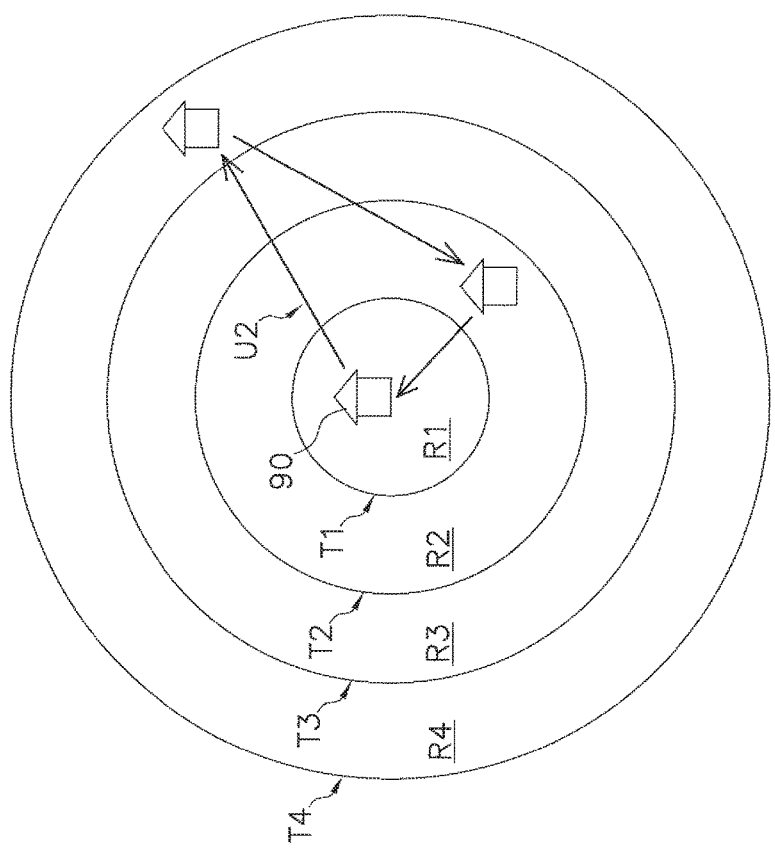
FIG. 8 is a drawing of a second example of a behavior pattern of the user.

FIG. 8 is a drawing showing a second example of the behavior pattern of the user 92. In FIG. 8, arrows are used to indicate a second away route U2, which is a behavior pattern beginning with the user 92 leaving the building 90 and ending with the user returning. FIG. 8 shows the distance threshold values T1 to T4 and the areas R1 to R4. In FIG. 9, which is a table similar to FIG. 3, only the second away route U2 is indicated by the arrows. The behavior of the user 92 while away is to pass through the areas R1 to R4 with the passage times shown in FIG. 9.

In this example, first, the user 92 is detected to be away in step S1 of FIG. 4, after which, in step S2, the away time during which the user 92 is away is calculated to be 55 minutes as with the first example, and in step S3, the setback value is set to the setback value S3 corresponding to the area R3.

Next, in step S4, as with the first example, the setback time is set to 10 minutes. Next, in step S5, as with the first example, when the setback time of 10 minutes is determined to have elapsed since the user 92 left, the process transitions to step S2. In step S2, as with the first example, the away time is calculated to be 45 minutes, and in step S3, the setback value is set to the setback value S2 corresponding to the area R2.

Next, in step S4, as with the first example, the setback time is set to 30 minutes. However, when 20 minutes have elapsed since the timepoint when the user 92 traveled into the area R2 (when 30 minutes have elapsed since the user left), the current position of the user 92 changes from the area R2 to the area R3 due to the user 92 passing the distance threshold value T2, as shown in FIG. 9. In this case, in step S6, the area where the user 92 is currently positioned is determined to have changed, and the process transitions to step S2. In step S2, the away time is calculated to be 140 minutes, which is the total of the first passage time of the area R3 (15 minutes), the second passage time of the area R4 (60 minutes), the third passage time of the area R3 (20 minutes), the third passage time of the area R2 (30 minutes), and the third passage time of the area R1 (15 minutes). Because the away time (140 minutes) is longer than the return time of the area R3 (65 minutes), in step S3, the setback value is set to the setback value S4 corresponding to the area R4.

Next, in step S4, the setback time is set to 15 minutes, which is the first passage time of the area R3. Next, in step S5, when 15 minutes have elapsed since the timepoint when the user 92 traveled into the area R3 (when 45 minutes have elapsed since the user left), the process transitions to step S2. At this time, the current position of the user 92 changes from the area R3 to the area R4 due to the user 92 passing the distance threshold value T3. In step S2, the away time is calculated to be 125 minutes, which is the total of the second passage time of the area R4 (60 minutes), the third passage time of the area R3 (20 minutes), the third passage time of the area R2 (30 minutes), and the third passage time of the area R1 (15 minutes). Because the away time (125 minutes) is longer than the return time of the area R3 (65 minutes), in step S3, the setback value is set to the setback value S4 corresponding to the area R4.

Next, in step S4, the setback time is set to 60 minutes, which is the second passage time of the area R4. Next, in step S5, when 60 minutes have elapsed since the timepoint when the user 92 traveled into the area R4 (when 105 minutes have elapsed since the user left), the process transitions to step S2. At this time, the current position of the user 92 changes from the area R4 to the area R3 due to the user 92 passing the distance threshold value T3. In step S2, the away time is calculated to be 65 minutes, which is the total of the third passage time of the area R3 (20 minutes), the third passage time of the area R2 (30 minutes), and the third passage time of the area R1 (15 minutes). Because the away time (65 minutes) is longer than the return time of the area R2 (45 minutes) and is equal to or less than the return time of the area R3 (65 minutes), in step S3, the setback value is set to the setback value S3 corresponding to the area R3.

Next, in step S4, the setback time is set to 20 minutes, which is the third passage time of the area R3. Next, in step S5, when 20 minutes have elapsed since the timepoint when the user 92 traveled into the area R3 (when 125 minutes have elapsed since the user left), the process transitions to step S2. At this time, the current position of the user 92 changes from the area R3 to the area R2 due to the user 92 passing the distance threshold value T2. In step S2, the away time is calculated to be 45 minutes, which is the total of the third passage time of the area R2 (30 minutes) and the third passage time of the area R1 (15 minutes). Because the away time (45 minutes) is longer than the return time of the area R1 (15 minutes) and is equal to or less than the return time of the area R2 (45 minutes), in step S3, the setback value is set to the setback value S2 corresponding to the area R2.

Next, in step S4, the setback time is set to 30 minutes, which is the third passage time of the area R2. However, because the returning user 92 passes through the area R2 in 60 minutes as shown in FIG. 9, when 30 minutes have elapsed since the timepoint when the user 92 traveled into the area R2 (when 155 minutes have elapsed since the user left), the current position of the user 92 does not change from the area R2 to the area R1. In this case, the instrument control unit 44 estimates that the returning user 92 will pass through the area R2 in the fourth passage time of 60 minutes, and in step S4, sets the setback time to 60 minutes, which is the fourth passage time of the area R2. Thereafter, in step S5, when 60 minutes have elapsed since the timepoint when the user 92 traveled into the area R2 (when 185 minutes have elapsed since the user left), the process transitions to step S2. At this time, the current position of the user 92 changes from the area R2 to the area R1 due to the user 92 passing through the distance threshold value T1. In step S2, the away time is calculated to be 15 minutes, which is the third passage time of the area R1. Because the away time (15 minutes) is equal to or less than the return time of the area R1 (15 minutes), in step S3, the setback value is set to the setback value S1 corresponding to the area R1.

Next, in step S4, the setback time is set to 15 minutes, which is the third passage time of the area R1. Then, in step S5, when the setback time of 15 minutes has elapsed since the timepoint when the user 92 traveled into the area R1 (when 200 minutes have elapsed since the user left), the process transitions to step S2. At this time, because the current position of the user 92 changes from the area R1 to the inside of the building 90 as shown in FIG. 9, the user 92 has returned. Therefore, the setback value is set to zero.

Figure 10:
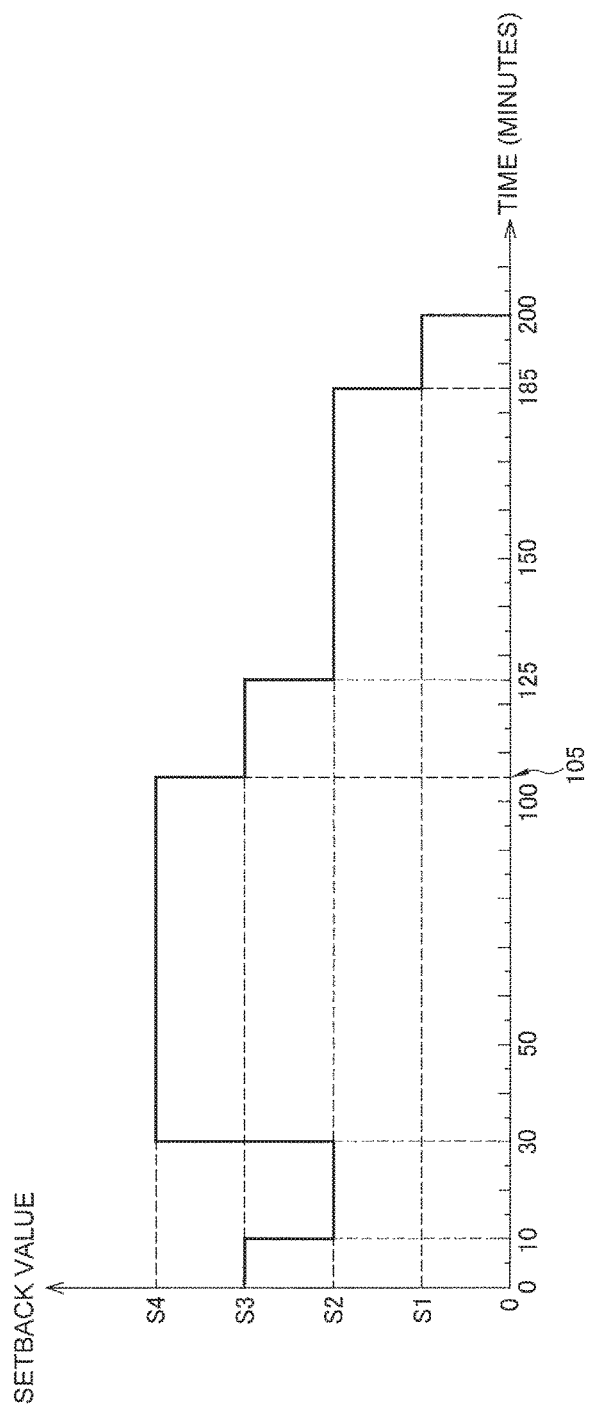
FIG. 10, corresponding to FIG. 8, is a graph representing the changes over time in the setback values.

FIG. 10 is a graph representing the change over time in the setback value while the user 92 is away and following the second away route U2 shown in FIG. 8. The vertical axis represents setback values, and the horizontal axis represents time.

While the user 92 is away, the air-conditioning control apparatus 40 can automatically control the setback value on the basis of data pertaining to the passage times of each of the areas R1 to R4 shown in FIG. 3, and the current position of the user 92, as shown in FIGS. 7 and 10.

(3) Characteristics

The air-conditioning control system 100 according to the present embodiment includes the air-conditioning control apparatus 40 to automatically control the set temperature of the air conditioner 50 while the user 92 is away. While the user 92 is away, the air-conditioning control apparatus 40 automatically controls the setback value on the basis of the current position of the user 92, i.e., the current position of the portable terminal 20 carried by the user 92. Specifically, the air-conditioning control apparatus 40 calculates the away time of the user 92 on the basis of the current position of the user 92, and sets a progressively greater setback value as the away time becomes longer. As the setback value becomes greater, the air conditioner 50 consumes less energy. The air-conditioning control system 100 can thereby effectively suppress the energy consumption of the air conditioner 50 while the user 92 is away, and can, through the air conditioner 50, ensure a comfort level in the building 90 when the user 92 returns to the building 90.

Thus, while the user 92 is away from the building 90, the air-conditioning control apparatus 40 performs a control to suppress the energy consumption of the air conditioner 50 in the building 90 on the basis of distance information indicating how far the portable terminal 20 carried by the user 92 is from the building 90, and also on the basis of the away time of the user 92. Therefore, the air-conditioning control system 100 can conserve energy as well as maintain a comfort level through a simple and highly precise method.

Second Embodiment (1) Configuration of Air-Conditioning Control System

Figure 11:
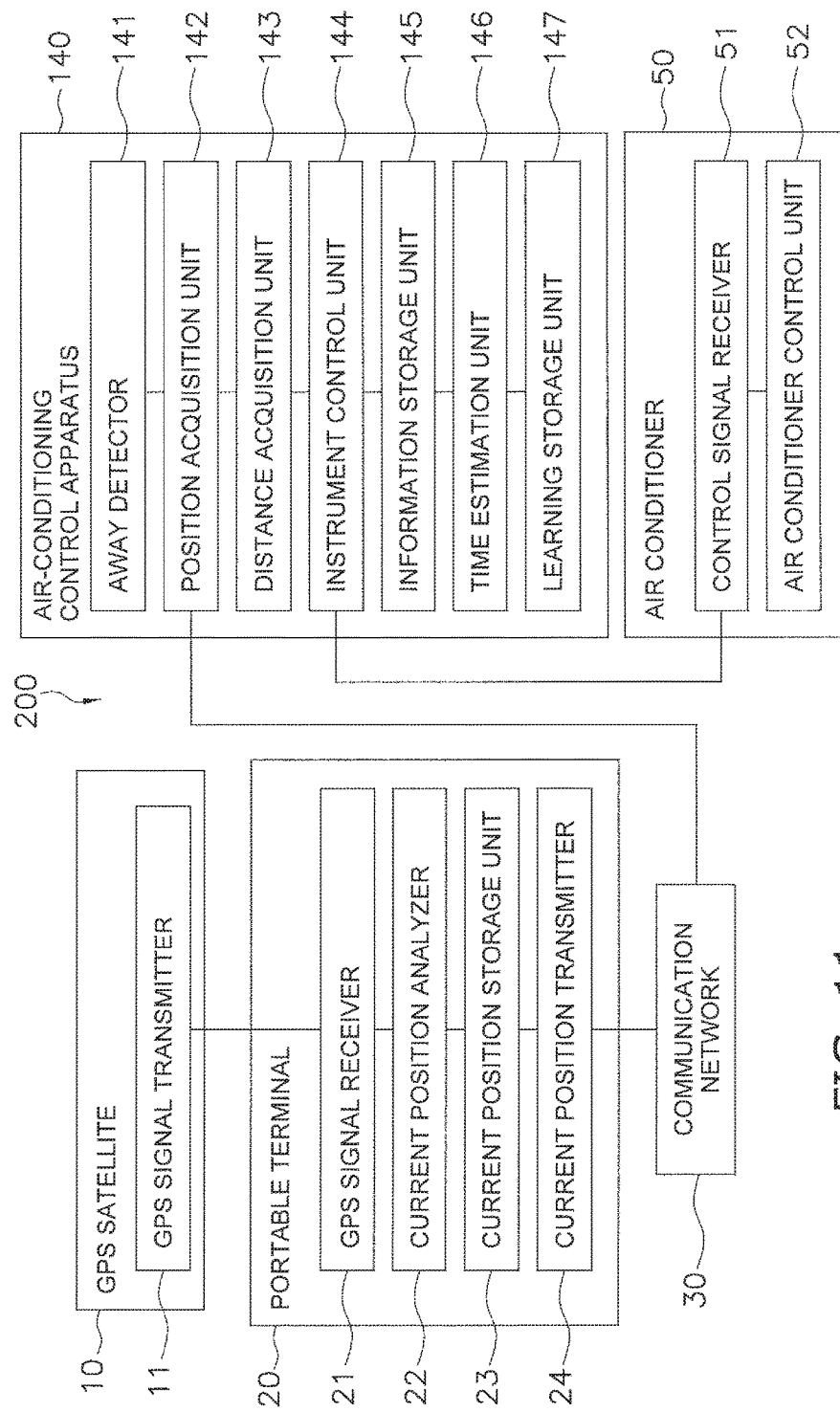
FIG. 11 is a block diagram showing a detailed configuration of an air-conditioning control system according to a second embodiment.

An air-conditioning control system 200 according to a second embodiment of the present invention shall be described. FIG. 11 is a block diagram showing a detailed configuration of the air-conditioning control system 200. The air-conditioning control system 200 of the present embodiment has the same configurations and functions as the air-conditioning control system 100 of the first embodiment, except for an air-conditioning control apparatus 140. Descriptions pertaining to configurations and functions shared with the air-conditioning control system 100 of the first embodiment are omitted.

The air-conditioning control apparatus 140 is mainly provided with an away detector 141, a position acquisition unit 142, a distance acquisition unit 143, a time estimation unit 146, an instrument control unit 144, an information storage unit 145, and a learning storage unit 147, as shown inn FIG. 11. The away detector 141, the position acquisition unit 142, the distance acquisition unit 143, and the information storage unit 145 have the same functions as, respectively, the away detector 41, the position acquisition unit 42, the distance acquisition unit 43, and the information storage unit 45 of the first embodiment.

The instrument control unit 144 records the passage times of each of the areas R1 to R4 for when the user 92 is going and when the user 92 is returning. The learning storage unit 147 learns and stores the recorded passage times. Specifically, on the basis of the recorded passage times, the learning storage unit 147 determines the passage times of each of the areas R1 to R4 for going and returning that will be used by the instrument control unit 144 to set the setback value. The time estimation unit 146 acquires the away time of the user 92 on the basis of the passage time determined by the learning storage unit 147. The instrument control unit 144 sets a setback value and controls the air conditioner 50 on the basis of the away time acquired by the time estimation unit 146.

(2) Actions of Air-Conditioning Control System

Next, a learning function of the learning storage unit 147, by which the passage times of each of the areas R1 to R4 for when the user 92 is going are determined, shall be specifically described with reference to the drawings. The following description can also be applied to the learning function of the learning storage unit 147 by which the passage times of each of the areas R1 to R4 for when the user 92 is returning are determined.

Figure 12:
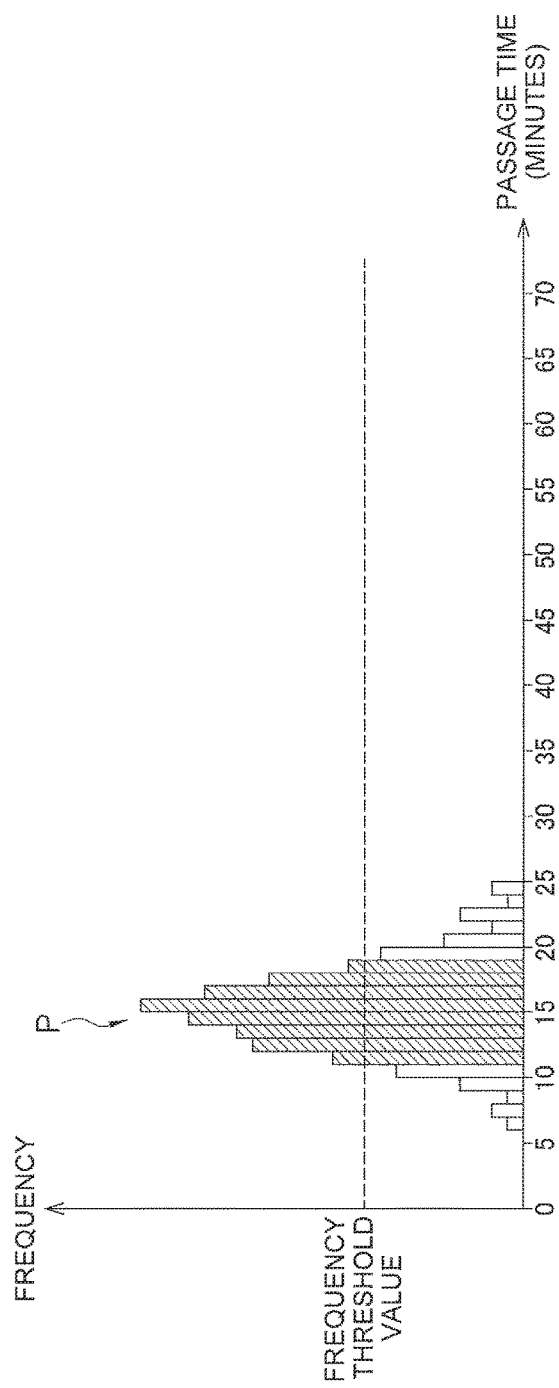
FIG. 12 is an example of a histogram of passage times for when the user is going.

The learning storage unit 147 creates data represented in a passage time histogram from the record of passage times of each of the areas R1 to R4 for when the user 92 is going. FIG. 12 is an example of a passage time histogram of the area R2 for when the user is going. In FIG. 12, the horizontal axis represents levels of passage times (positions of bins), and the vertical axis represents a frequency of each of the bins. The number and width of the bins of the histogram are set as appropriate. In FIG. 12, the width of a bin is one minute. A dotted line parallel to the horizontal axis, which represents a frequency threshold value, is shown in FIG. 12. The frequency threshold value is set as appropriate.

The learning storage unit 147 determines the passage time used to set the setback value, on the basis of a bin having a frequency that exceeds the frequency threshold value. FIG. 12 shows one pattern P configured from bins having a frequency that exceeds the frequency threshold value. In FIG. 12, the bins configuring the pattern P are depicted with hatching. The number of bins included in the pattern P is arbitrary, but a lower limit value may be set. The learning storage unit 147 uses, e.g., the average value of the pattern P as the passage time used to set the setback value. The learning storage unit 147 may use any one of the median value, the mode value, the maximum value, and the minimum value of the pattern P, instead of the average value of the pattern P, as the passage time used to set the setback value. The learning storage unit 147 regards results data of the passage time as nonexistent when there exist no bins having a frequency that exceeds the frequency threshold value.

The learning storage unit 147 can use all of the passage times recorded in a predetermined time period as the record of passage times used to create the histogram. The predetermined time period, which is set as appropriate, could be, e.g., a time period from one month prior up to the present, or a time period from one year prior up to the present. Additionally, the predetermined time period may be a one-month period of the same month of the previous year.

Figure 13:
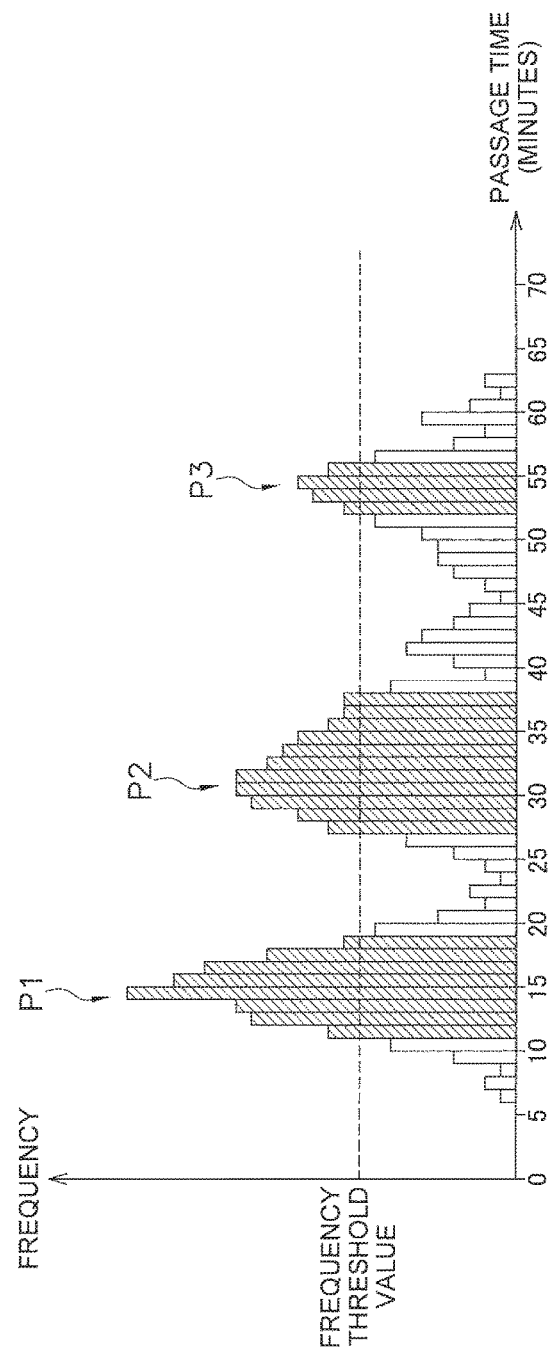
FIG. 13 is an example of a histogram of passage times for when the user is going.

FIG. 13 is another example of a passage time histogram of the area R2 for when the user is going. FIG. 13 shows three patterns configured from bins having frequencies that exceed the frequency threshold value. Patterns P1 to P3 are shown in order of shortest passage time in FIG. 13. The bins configuring the patterns P1 to P3 are shown with hatching in FIG. 13. In this case, the learning storage unit 147 determines a passage time used to set the setback value for each of the patterns P1 to P3. In the case of FIG. 13, the learning storage unit 147 determines three passage times corresponding to each of the patterns P1 to P3. When a plurality of passage times are determined in this manner, the instrument control unit 144 may use the determined passage times separately depending on various conditions. The various conditions are, inter alia, the current day, the current time, the weather, and the plans of the user 92. For example, the instrument control unit 144 may set the setback value on the basis of the passage time corresponding to the pattern P1 when the current time is 11:00 am, set the setback value on the basis of the passage time corresponding to the pattern P2 when the current day is Sunday, and set the setback value on the basis of the passage time corresponding to the pattern P3 when the weather is rainy.

With the method described above, the learning storage unit 147 determines each of the passage times for going and returning in each of the areas R1 to R4. The frequency threshold value used to determine the passage time may be a different value for each of the areas R1 to R4, and may be a different value for when the user is going and for when the user is returning.

(3) Characteristics

The air-conditioning control system 200 can determine the passage time used to set the setback value by learning the passage times of each of the areas R1 to R4 for when the user 92 is going and for when the user 92 is returning. Therefore, the air-conditioning control system 200 can determine passage times that match the behavior pattern of the user 92, and can therefore set appropriate setback values. Additionally, even when the behavior pattern of the user 92 changes, the air-conditioning control system 200 can set appropriate setback values by periodically performing passage time learning and updating the passage time used to set the setback value. Therefore, the air-conditioning control system 200 can conserve energy and also maintain the comfort level more efficiently.

(1) Modification A

In the embodiments, the current position of the portable terminal 20 is calculated utilizing the GPS function of the portable terminal 20, and using radio waves received from the plurality of GPS satellites 10. However, the current position of the portable terminal 20 may be calculated utilizing a position-measuring function other than a GPS, as long as measurement error is in a range of up to approximately several dozen meters and the technique can be achieved with an instrument that the user can carry on their person. For example, the current position of the portable terminal 20 may be calculated using a measurement technique of estimating the position of the portable terminal 20 on the basis of the position of a base station of the portable terminal 20.

(2) Modification B

In the embodiments, the air-conditioning control apparatus 40 is a dedicated electronic instrument including a micro-controller and an input/output interface. However, the air-conditioning control apparatus 40 may be a general-purpose computer. In this case, the air-conditioning control apparatus 40 executes programs having the functions of the away detector 41, the position acquisition unit 42, the distance acquisition unit 43, the instrument control unit 44, and the information storage unit 45 to control the air conditioner 50. The air-conditioning control apparatus 40 may be built into the air conditioner 50.

(3) Modification C

In the embodiments, the away detector 41 of the air-conditioning control apparatus 40 analyzes images captured by a monitoring camera installed in an entrance/exit of the building 90, and detects that the user 92 is away. However, the away detector 41 may detect that the user 92 is away by another method. For example, the away detector 41 may use a human detection sensor installed in the entrance/exit of the building 90 to detect that the user 92 is away, or may detect that the user 92 is away on the basis of the current position of the portable terminal 20 of the user 92.

(4) Modification D

In the embodiments, the distance acquisition unit 43 of the air-conditioning control apparatus 40 acquires distance information from the position of the building 90 and from the current position of the portable terminal 20 stored in the information storage unit 45, when the away detector 41 detects that the user 92 is away. However, the distance acquisition unit 43 may acquire distance information using the current position of the air-conditioning control apparatus 40 or the current position of the air conditioner 50 instead of the position of the building 90.

(5) Modification E

In the embodiments, the distance acquisition unit 43 of the air-conditioning control apparatus 40 acquires the terminal distance, which is the linear distance between the current position of the portable terminal 20 and the position of the building 90 on the earth's surface. However, the distance acquisition unit 43 may acquire, as the terminal distance, a distance along a road from the current position of the portable terminal 20 to the position of the building 90. In this case, the distance acquisition unit 43 may acquire map data of the area surrounding the building 90 from the internet etc. and may calculate the terminal distance on the basis of the map data.

(6) Modification F

In the embodiments, the distance acquisition unit 43 of the air-conditioning control apparatus 40 acquires the terminal distance, which is the linear distance between the current position of the portable terminal 20 and the position of the building 90 on the earth's surface. Specifically, the terminal distance in the embodiments is a distance on a two-dimensional plane. However, the distance acquisition unit 43 may use a distance that also accounts for a height direction as the terminal distance. In this case, the terminal distance is a distance within a three-dimensional space. For example, the building 90 could be a high-rise apartment, and the user 92 could be a resident of one room therein. In this case, the terminal distance of the portable terminal 20 outside of the building 90 would be longer for a residence of a user 92 living on an upper floor than for a residence of a user 92 living on a lower floor.

(7) Modification G

In the embodiments, the user 92 is envisioned as being a lone resident of the building 90. However, the air-conditioning control system 100 can be applied also to cases of a plurality of users 92 residing in the building 90. In this case, the users 92 carry personal dedicated portable terminals 20. The distance acquisition unit 43 of the air-conditioning control apparatus 40 acquires the terminal distance, which is the distance between the building 90 and the portable terminal 20, for each of the plurality of portable terminals 20. The instrument control unit 44 calculates a setback value for each user 92 on the basis of the passage times for going and returning for each of the areas R1 to R4 determined for each user 92, and on the basis of the terminal distance of the portable terminal 20 of each user 92. The instrument control unit 44 then controls the air conditioner 50 on the basis of the smallest calculated setback value. Therefore, the instrument control unit 44 can control the air conditioner 50 so that the comfort level in the building 90 is ensured even when, e.g., the user 92 having the longest away time returns to the building 90 ahead of the other users 92 due to a sudden change in plans.

In the present modification, the optimal setback value can be set and the air conditioner 50 can be controlled even when there are a plurality of users 92 of the building 90. Therefore, the air-conditioning control system 100 according to the present modification can conserve energy as well as maintain the comfort level.

(8) Modification H

In the embodiments, the air-conditioning control apparatus 40 calculates and sets the setback value when the user 92 leaves, when the passage time of the area R1 to R4 where the user 92 is currently positioned elapses, and when the area R1 to R4 where the user 92 is currently positioned changes. However, the air-conditioning control apparatus 40 may periodically calculate and set the setback value at predetermined time intervals. For example, the air-conditioning control apparatus 40 may calculate and set the setback value in five-minute intervals.

(9) Modification I

In the embodiments, the air-conditioning control apparatus 40 acquires the current position of the portable terminal 20 from the portable terminal 20 via the communication network 30. However, the air-conditioning control apparatus 40 may acquire the current position of the portable terminal 20 from the portable terminal 20 via a dedicated server. In this case, the current position transmitter 24 of the portable terminal 20 transmits the current position of the portable terminal 20 to the dedicated server, and the position acquisition unit 42 of the air-conditioning control apparatus 40 receives the current position of the portable terminal 20 from the dedicated server.

(10) Modification J

In the embodiments, the distance threshold values T1 to T4 and the setback values S1 to S4 are set manually by someone such as a manager of the air-conditioning control system 100. However, the distance threshold values T1 to T4 and the setback values S1 to S4 may be set automatically by the air-conditioning control system 100.

For example, the air-conditioning control apparatus 40 may calculate the distance threshold values T1 to T4 and the setback values S1 to S4 in accordance with the movement route of the user 92 outside of the building 90, the seasons, the air-conditioning operation mode, the outside air temperature, and the room temperature.

(11) Modification K

In the embodiments, the areas R1 to R4 are set as areas through which the user 92 passes while away. However, the number of areas through which the user 92 passes while away may be set as appropriate in accordance with the range of behavior of the user 92 while away from the building 90.

(12) Modification L

In the embodiments, the air-conditioning control apparatus 40 estimates the current position of the user 92 on the basis of the current position of the portable terminal 20. However, the air-conditioning control apparatus 40 may utilize an instrument other than the portable terminal 20 to control the air conditioner 50 for cases in which the user 92 leaves having forgotten the portable terminal 20 inside the building 90. Possible examples of such an instrument include, e.g., a human detection sensor installed in the building 90, a device other than the portable terminal 20, a commuter pass, and a company card.

In the case of a human detection sensor installed in the building 90, the air-conditioning control apparatus 40 may determine that the user 92 is not inside the building 90 and control the air conditioner 50 on the basis of the setback value when the human detection sensor is unable to detect the user 92 for a certain time period.

Additionally, in the case of the device other than the portable terminal 20, the user 92 may use a personal notebook PC, etc., to remotely operate the air-conditioning control apparatus 40, and may control the air conditioner 50 on the basis of the setback value.

Additionally, in the case of a commuter pass and a company card, the air-conditioning control apparatus 40 may acquire the current position of the user 92 on the basis of a usage record of the commuter pass and the company card, and may control the air conditioner 50 on the basis of the setback value.

(13) Modification M

In the embodiments, the air-conditioning control apparatus 40 sets the setback value to control the air conditioner 50. However, the air-conditioning control apparatus 40 may change the operating frequency of the air conditioner 50, instead of the setback value, to control the air conditioner 50. The operating frequency of the air conditioner 50 is the operating frequency of a compressor inside the air conditioner 50.

The air-conditioning control apparatus 40 of the present modification controls the air conditioner 50 by changing, the operating frequency of the air conditioner 50 on the basis of the current position of the user 92 while the user 92 is away. For example, the air-conditioning control apparatus 40 calculates the away time of the user 92 on the basis of the current position of the user 92, and as the away time becomes longer, the air-conditioning control apparatus 40 progressively lowers the operating frequency of the air conditioner 50 and reduces the energy consumed by the air conditioner 50. Additionally, as the away time becomes longer, the air-conditioning control apparatus 40 may progressively lower the upper limit of the operating frequency of the air conditioner 50 and reduce the energy consumed by the air conditioner 50. Additionally, when the away time is equal to or greater than a predetermined value, the air-conditioning control apparatus 40 may fix the operating frequency of the air conditioner 50 at a predetermined value or stop the air conditioner 50 to reduce the energy consumed by the air conditioner 50. The air-conditioning control system 100 according to the present modification can conserve energy as well as maintain the comfort level, similar to the air-conditioning control system 100 of the embodiments.

(14) Modification N

In Modification M, the air-conditioning control apparatus 40 controls the operating frequency of the air conditioner 50 on the basis of the distance information while the user 92 is away. However, the air-conditioning control apparatus 40 may set a lower limit value and an upper limit value of the operating frequency of the air conditioner 50. For example, the instrument control unit 44 of the air-conditioning control apparatus 40 changes the operating frequency of the air conditioner 50 to be within a range from a predetermined lower limit value to a predetermined upper limit value. In this case, the operating frequency of the air conditioner 50 does not fall below the predetermined lower limit value and does not rise above the predetermined upper limit value.

Figure 14:
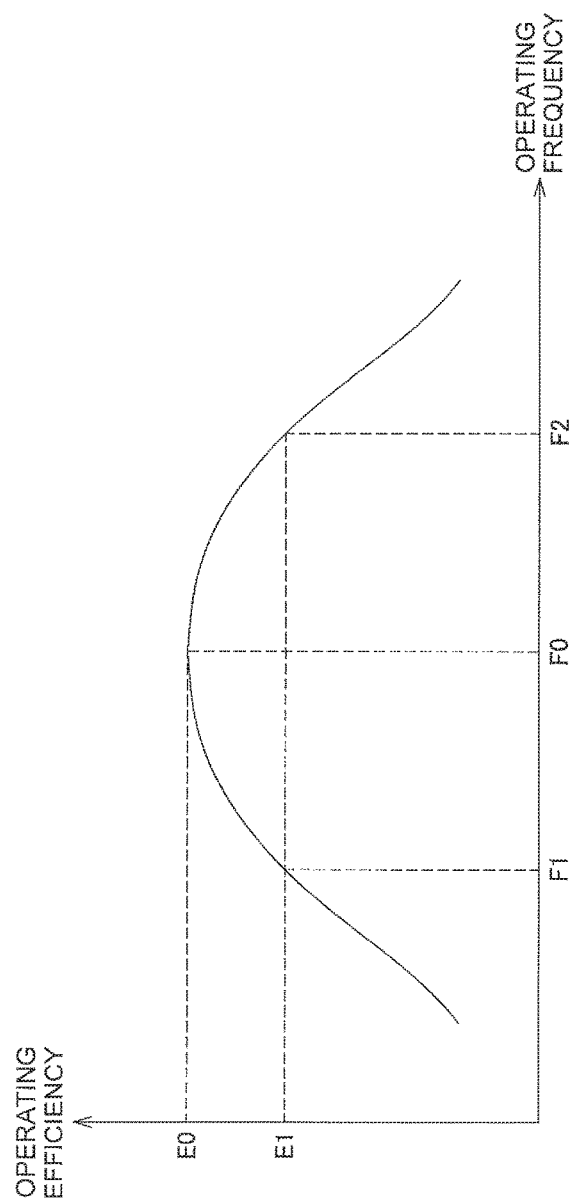
FIG. 14 is a graph representing a relationship between operating frequency of an air conditioner and operating efficiency of the air conditioner, according to Modification N.

FIG. 14 is a graph representing a relationship between the operating frequency of the air conditioner 50 and operating efficiency of the air conditioner 50. In the graph of FIG. 14, the horizontal axis represents the operating frequency of the air conditioner 50, and the vertical axis represents the operating efficiency of the air conditioner 50. The operating efficiency of the air conditioner 50 reaches a maximum value E0 at a predetermined operating frequency F0, and exhibits a tendency to monotonically decrease from E0 as the operating frequency becomes greater from F0 or as the operating frequency becomes smaller from F0, as shown in FIG. 14. Therefore, in cases in which, e.g., the operating frequency of the air conditioner 50 is further lowered in order to increase the setback value as the distance between the portable terminal 20 of the user 92 and the building 90 becomes longer, there is a risk of the operating efficiency of the air conditioner 50 becoming too low.

In the present modification, because a lower limit value and an upper limit value are set on the operating frequency of the air conditioner 50, the occurrence of the problem of a too-low operating efficiency of the air conditioner 50 is suppressed. Specifically, a lower limit value E1 of the operating efficiency of the air conditioner 50 is set in the air-conditioning control apparatus 40 on the basis of the distance information. In this case, a lower limit value F1 and an upper limit value F2 of the operating frequency of the air conditioner 50 are, respectively, a minimum value F1 and a maximum value F2 of an operating frequency range in which the operating efficiency of the air conditioner 50 is equal to or greater than the lower limit value E1, as shown in FIG. 14. The air-conditioning control system 100 according to the present modification is able to efficiently operate the air-conditioning control apparatus 40 because the operating efficiency of the air conditioner 50 does not fall below the lower limit value E1 while the user 92 is away.

The instrument control unit 44 of the air-conditioning control apparatus 40 may set the lower limit value E1 of the operating efficiency of the air conditioner 50 progressively higher as the distance between the portable terminal 20 of the user 92 and the building 90 becomes longer. The air-conditioning control system 100 is thereby able to operate the air-conditioning control apparatus 40 more efficiently.

(15) Modification O

In the embodiments, the air-conditioning control apparatus 40 controls the setback value. The setback value is the difference between the away-time set temperature, which is the set temperature of the air conditioner 50 when the away detector 41 detects that the user 92 is away, and the current set temperature of the air conditioner 50. However, during the air-cooling operation, the air-conditioning control apparatus 40 may also control an evaporation temperature of a refrigerant of the air conditioner 50 in addition to controlling the setback value. Specifically, during the air-cooling operation, the air-conditioning control apparatus 40 may perform a control to raise the evaporation temperature of the refrigerant of the air conditioner 50. The air-conditioning control system 100 is thereby able to operate the air-conditioning control apparatus 40 more efficiently.

Additionally, the air-conditioning control system 100 may control the evaporation temperature of the refrigerant of the air conditioner 50 on the basis of the distance information while the user 92 is away, in order to achieve even more efficient operation. For example, the air-conditioning control system 100 may perform a control to further raise the evaporation temperature of the refrigerant of the air conditioner 50 as the distance between the portable terminal 20 of the user 92 and the building 90 becomes longer.

The air-conditioning control system 100 can also operate the air-conditioning control apparatus 40 more efficiently by performing either a combination control that combines the control of the present modification and the control of Modification M, or a combination control that combines the control of the present modification and the control of Modification N.

(16) Modification P

In the embodiments, the air-conditioning control apparatus 40 controls the setback value. The setback value is the difference between the away-time set temperature, which is the set temperature of the air conditioner 50 when the away detector 41 detects that the user 92 is away, and the current set temperature of the air conditioner 50. However, during an operation, the air-conditioning control apparatus 40 may also control a water supply temperature or an air supply temperature of the air conditioner 50 in addition to controlling the setback value. Specifically, the air-conditioning control apparatus 40 may perform a control to raise the water supply temperature or the air supply temperature of the air conditioner 50 during the air-cooling operation, and to lower the water supply temperature or the air supply temperature of the air conditioner 50 during the air-warming operation. The air-conditioning control system 100 is thereby able to operate the air-conditioning control apparatus 40 more efficiently.

Additionally, for operation to be even more efficient, the air-conditioning control system 100 may control the water supply temperature or the air supply temperature of the air conditioner 50 on the basis of the distance information while the user 92 is away. For example, the air-conditioning control system 100 may perform a control to further raise the water supply temperature or the air supply temperature of the air conditioner 50 during the air-cooling operation, and to further lower the water supply temperature or the air supply temperature of the air conditioner 50 during the air-warming operation, as the distance between the portable terminal 20 of the user 92 and the building 90 becomes longer.

The air-conditioning control system 100 can also operate the air-conditioning control apparatus 40 more efficiently by performing either a combination control that combines the control of the present modification and the control of Modification M, or a combination control that combines the control of the present modification and the control of Modification N.

Additionally, the air-conditioning control system 100 can operate the air-conditioning control apparatus 40 more efficiently by performing either a combination control that combines the control of the present modification, the control of Modification O, and the control of Modification M, or a combination control that combines the control of the present modification, the control of Modification O, and the control of Modification N.

(17) Modification Q

In the embodiments, the air conditioner 50 is an air-cooling and air-warming instrument including a refrigeration circuit. The air conditioner 50 may include various air-warming apparatuses. For example, the air conditioner 50 may include a heat pump, a boiler, or a furnace (a gas furnace etc.) as an air-warming apparatus. Additionally, the air conditioner 50 may include, as an air-warming apparatus, a hybrid instrument of a heat pump and a boiler, or a hybrid instrument of a heat pump and a furnace.

The air-conditioning control apparatus 40 of Modification N can use a heat pump, a boiler, a furnace, and the aforementioned hybrid instruments as the air conditioner 50. The air-conditioning control apparatus 40 of Modification O can use a heat pump and the aforementioned hybrid instruments as the air conditioner 50. The air-conditioning control apparatus 40 of Modification P can use a heat pump, a boiler, a furnace, and the aforementioned hybrid instruments as the air conditioner 50.

When a boiler or a furnace is used as the air-warming apparatus, the air-conditioning control apparatus 40 can suppress the amount of energy consumed or perform an operation that accounts for efficiency by, inter alia, adjusting the fuel supply rate instead of the operating frequency of the compressor inside the air conditioner 50.

(18) Modification R

In the embodiments, in the table showing one example of the passage times of each of the areas R1 to R4 shown in FIG. 3, two types of passage times are set for when the user 92 is going, and two types of passage times are set for when the user 92 is returning. However, three or more types of passage times may be set for when the user 92 is going, and three or more types of passage times may be set for when the user 92 is returning. In this case, the passage times may be set according to the current time, the weather, and other various conditions.

(19) Modification S

In the embodiments, the air-conditioning control apparatus 40 is a computer installed in the building 90. However, the air-conditioning control apparatus 40 may be a computer installed outside the building 90 and connected to the air conditioner 50 inside the building 90 via the internet or another network. In this case, the function of the air-conditioning control apparatus 40 may be a service provided in the form of cloud computing. In this modification, the function of the air-conditioning control apparatus 40 is actualized through the programs of, inter alia, the away detector 41, the position acquisition unit 42, the distance acquisition unit 43, the instrument control unit 44, the information storage unit 45, and the time estimation unit 46.

INDUSTRIAL APPLICABILITY

The air-conditioning control apparatus according to the present invention can conserve energy as well as maintain a comfort level.

What is claimed is:

1. An air-conditioning control apparatus, comprising:
a computer arranged and configured to communicate with an air conditioner and to receive a signal indicating whether or not a user is away from a building in which the air conditioner is installed,
the computer being programmed to:
acquire position information of a portable terminal carried by the user;
use the position information to acquire distance information indicating how far the portable terminal is from the building when the away detector has detected that the user is away;
learn and store a plurality of passage times using the distance information, each of the passage times being a time needed by the user to pass through one of a plurality of preset areas, the plurality of preset areas including at least a preset area including positions at linear distances larger than a first distance threshold and smaller than or equal to a second distance threshold from the building, the second distance threshold being larger than the first distance threshold, the passage times including
a first passage time that is a shortest time needed for the user to travel from the first distance threshold to the second distance threshold while going away from the building,
a second passage time that is a shortest time needed from when the user passes through a spot at the first distance threshold while going away from the building until the user once more passes through the spot at the first distance threshold while returning toward the building, and
a third passage time that is a shortest time needed for the user to travel from the second distance threshold to the first distance threshold while returning toward the building;
calculate an away time based on the passage times when the signal indicates that the user is away from the building, the away time being an estimated value of a time beginning at a current timepoint and ending at a timepoint when the user returns; and
control the air conditioner based on the distance information and the away time so that the air conditioner consumes less energy,
the computer controlling the air conditioner by changing a setback value based on the away time, the setback value being a difference between a current set temperature of the air conditioner and a set temperature of the air conditioner when the away detector detects that the user is away from the building,
the computer changing the setback value based on the away time,
when the air conditioner is performing an air-warming operation, the computer progressively increasing the setback value to lower the set temperature as the away time becomes longer, and
when the air conditioner is performing an air-cooling operation, the computer progressively increasing the setback value to raise the set temperature as the away time becomes longer.

2. The air-conditioning control apparatus according to claim 1, wherein
the computer changes the setback value based on the away time and a shortest time needed by the user to return from each of a plurality of preset areas.

3. The air-conditioning control apparatus according to claim 1, wherein
the portable terminal is one of a plurality of portable terminals, and
the computer calculates a plurality of the setback values based on the distance information and the away time for each one of the plurality of the portable terminals, and controls the air conditioner using the smallest setback value among the plurality of the setback values.

4. The air-conditioning control apparatus according to claim 1, wherein
the computer controls the air conditioner via any one of
a first control to change an operating frequency of the air conditioner,
a second control to change an evaporation temperature of a refrigerant of the air conditioner,
a third control to change a water supply temperature or an air supply temperature of the air conditioner,
a fourth control that is a combination control of the first control and the second control,
a fifth control that is a combination control of the first control and the third control, and
a sixth control that is a combination control of the first control, the second control, and the third control.

5. The air-conditioning control apparatus according to claim 4, wherein
the computer changes the operating frequency to be within a range from a predetermined lower limit value to a predetermined upper limit value in the first control, the fourth control, the fifth control, and the sixth control.

6. The air-conditioning control apparatus according to claim 2, wherein
the portable terminal is one of a plurality of portable terminals, and
the computer calculates a plurality of the setback values based on the distance information and the away time for each one of the plurality of the portable terminals, and controls the air conditioner using the smallest setback value among the plurality of the setback values.

7. The air-conditioning control apparatus according to claim 2, wherein
the computer controls the air conditioner via any one of
a first control to change an operating frequency of the air conditioner,
a second control to change an evaporation temperature of a refrigerant of the air conditioner,
a third control to change a water supply temperature or an air supply temperature of the air conditioner,
a fourth control that is a combination control of the first control and the second control,
a fifth control that is a combination control of the first control and the third control, and
a sixth control that is a combination control of the first control, the second control, and the third control.

8. The air-conditioning control apparatus according to claim 3, wherein
the computer controls the air conditioner via any one of
a first control to change an operating frequency of the air conditioner,
a second control to change an evaporation temperature of a refrigerant of the air conditioner,
a third control to change a water supply temperature or an air supply temperature of the air conditioner,
a fourth control that is a combination control of the first control and the second control,
a fifth control that is a combination control of the first control and the third control, and
a sixth control that is a combination control of the first control, the second control, and the third control.

* * * * *